June 23, 1970 H. DIETERLE ET AL 3,516,776
LIGHTER
Filed May 15, 1968

Inventors:
Horst Dieterle
Peter Rabe
by Michael S. Striker
Attorney

United States Patent Office

3,516,776
Patented June 23, 1970

---

3,516,776
LIGHTER
Horst Dieterle, Frankfurt am Main, and Peter Rabe, Muhlheim am Main, Germany, assignors to Heinrich Maltner G.m.b.H., Offenbach am Main, Germany
Filed May 15, 1968, Ser. No. 729,222
Claims priority, application Germany, May 24, 1969
M 74,090
Int. Cl. F23d 21/00
U.S. Cl. 431—344     13 Claims

ABSTRACT OF THE DISCLOSURE

In a gas lighter a fuel tank consists of two hollow sections of synthetic plastic material which are adapted to be welded together so as to define an internal fuel chamber. One of the sections is provided interiorly with an abutment portion and the other section is provided interiorly with a substantially sleeve-shaped portion projecting across the chamber toward the abutment portion, the sleeve-shaped portion having an open first end facing the abutment portion and a second end communicating with the exterior of the tank. A valve assembly is received in the sleeve-shaped portion accessible from the exterior of the fuel tank and operable for closing and opening communication between the inner and outer ends of the sleeve-shaped portion. The valve assembly is maintained in the sleeve-shaped portion against displacement from predetermined position by the abutment portion of the one tank section.

BACKGROUND OF THE INVENTION

The present invention relates to lighters in general, and more particularly to lighters utilizing gaseous fluid.

In lighters, particularly in gas lighters, it is known to construct the various valves which are needed, namely the burner valve and the fueling valve, as screw nipples which are screwed into a tapped bore provided in the fuel tank. A gasket is interposed to make the connection fluid-tight. The screw nipple constitutes the valve housing within which the constituent components of the valve assembly are located, namely the sealing ring, the valve body and the valve spring. Further, there is provided in such constructions a bearing or abutment for the valve spring and a limit stop for limiting the valve body against excessive displacement. It is thus clear that in these known constructions each valve requires a minimum of seven components which in turn necessitate relatively complicated and therefore expensive assembly operations and preparatory operations such as tapping of the bore in the fuel tank and providing of the screw threads in the threaded nipple. Furthermore, the size of the opening required for inserting the nipple is relatively large which reduces the strength of the fuel tank. Additional disadvantages reside in the fact that the aforementioned prior-art constructions necessitate special precautions against disassembly of the valve by the user because the valve is accessible from the exterior of the tank for such manipulation, and also in the fact that where an axially slidable valve sealing ring is used, the roughness of the inner wall of the valve housing tends to damage the sealing ring and therefore to reduce the safety of operation of the lighter.

It is therefore the general object of the present invention to overcome the aforementioned disadvantages.

SUMMARY OF THE INVENTION

In accordance with one feature of our invention we provide, in a lighter and particularly in a gas lighter, a combination which includes a fuel tank consisting of two hollow tank sections which are fluid-tightly connected with one another. The sections advantageously consist of synthetic plastic material and may be connected together by welding or in another manner. In any case, when so connected they will define with one another an internal fuel chamber. One of these sections is provided interiorly thereof with an abutment portion and the other of the sections is provided interiorly thereof with a substantially sleeve-shaped portion which projects toward the abutment portion when the sections are connected in the manner described before, and the sleeve-shaped portion has an open inner end facing the abutment portion and an outer end which communicates with the exterior of the tank. A valve assembly is received in predetermined position in the sleeve-shaped portion and is accessible from the exterior of the fuel tank. The valve assembly is maintained, in accordance with the present invention, against displacement from its predetermined position by the one tank section, and more specifically by the abutment portion thereof, when the tank sections are connected with one another in the manner outlined above.

By so constructing the components mentioned above, we eliminate any need for screw-threaded securing of the valve with the tank. This obviously eliminates also the need for providing such screw-threads as well as the need for providing a gasket to seal the connection between the tank and the screw-threaded nipple as known from the prior art. Furthermore, the valve is now located within the tank, thereby being protected against damage from external influences and also being inaccessible for tampering by the user of the lighter. It is further advantageous, in accordance with another concept of the invention, if the sleeve-shaped portion itself constitutes the valve housing because this eliminates the need for a separate valve housing, decreases the opening for the valve and therefore increases the strength of the fuel tank. This latter result is obtained because with this construction there is less tendency of the tank wall to crack under internal stresses, and also because the stresses normally resulting from threading of the threaded nipple into the top bore of the fuel tank wall are eliminated. Of course, this construction also reduces unnecessary thickness of the lighter, the valve being totally located within the fuel tank, and this is not only advantageous because of the decreased bulk but also because it makes it possible to construct the lighter in slimmer and more aesthetically pleasing form.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
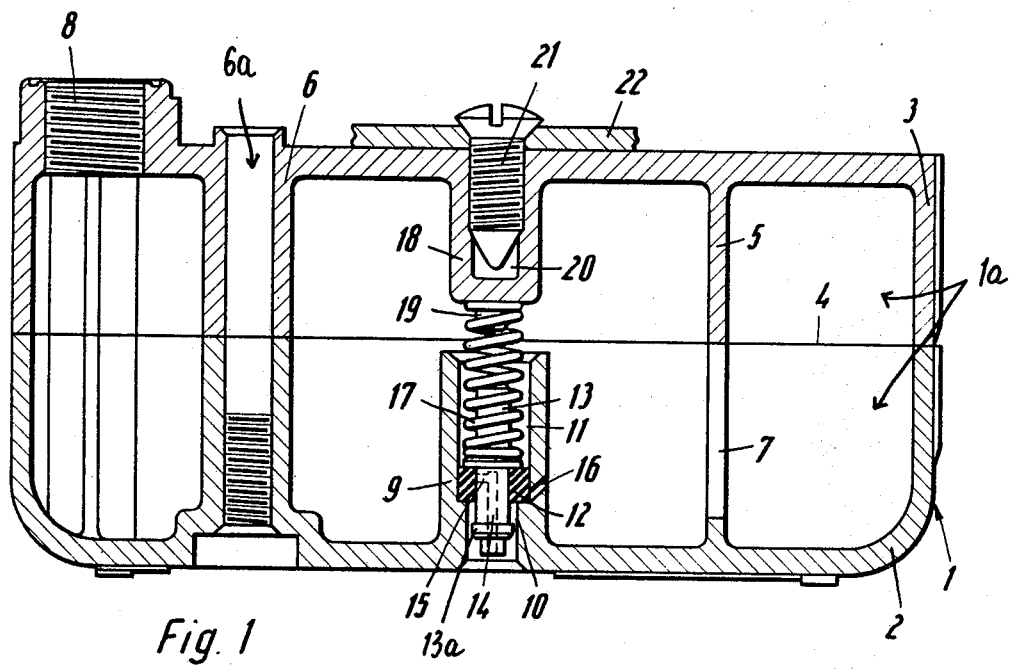
FIG. 1 is a vertical longitudinal section through a fuel tank constructed according to the present invention.

Discussing now the drawing in detail, and firstly FIG. 1 thereof, it will be seen that the fuel tank illustrated therein is identified generally with reference numeral 1. It consists of a lower tank section 2 and an upper tank section 3 which abut against each other along a line of separation, identified with reference numeral 4, and which in the illustrated embodiment are assumed to be welded together along this line 4. The sections 2 and 3 define with one another an internal fuel chamber 1a. To reinforce the tank 1 the latter is provided with a transverse wall 5 and a second transverse wall 6, both of which are provided with apertures 7 to establish communication between the various parts of the chamber 1a. The transverse wall 6 is further provided with a tubular portion 6a adapted to contain a flint and the conventional spring associated with such flint. Neither the flint nor the spring are shown because they are not of interest in accordance with the present invention and it will appreciated that, if an ignition system should be used which does not utilize the flint, the tubular portion 6a may be omitted. The tank section 3 is also provided with a screw thread 8 into which a burner valve may be threaded in conventional manner.

In accordance with our invention the interior of the section 2 comprises a sleeve-shaped portion 9 provided with a first cylindrical passage 10 of smaller diameter and, inwardly thereof, with a second cylindrical passage 11 of larger diameter. A sealing ring 12 is located in the passage 11 and surrounds and is secured to a valve body 13. The valve body 13 is provided with a longitudinal channel 14 with a transverse opening 15, both being shown in broken lines and being conventional, through which liquefied gaseous fuel may be introduced into the interior of the fuel chamber 1a. The sleeve-shaped portion 9 is further provided with an aperture or bore 16, which will here seem to be slanted, and which communicates with the interior of the fuel chamber 1a and with the passage 11 just inwardly of the radial seat or shoulder which separates the passage 11 from the passage 10. The opening 16 is provided for venting purposes.

A conventional valve spring 17 engages the valve body 13 pressing the same and thereby the sealing ring 12 against the valve seat or shoulder separating the passages 10 and 11. The opposite end of the valve spring 17 engages an abutment portion on the housing section 3, here illustrated as an inwardly extending projection 18 which advantageously is provided with a pin 19 of preferably conical shape which serves to locate and maintain the spring 17 with respect to the abutment portion 18. Advantageously, the housing section 3 is provided with a bore extending inwardly from the outside thereof and into the projection 18. The bore, which is a blind bore, is identified with reference numeral 20 and may serve to accommodate a securing element, here assumed to be a self-tapping screw 21, which in turn will secure auxiliary components, identified with reference numeral 22 in FIG. 1 and assumed to constitute a portion of the ignition mechanism, to the fuel tank 1.

In assembling the components described before, the sealing ring 12, the valve body 13 and the valve spring 17 are introduced from the inner open end into the channel 11. Thereupon, the welding instrumentality, the so-called "welding mirror" is placed on the abutment face of the tank section 2 and the tank section 3 is placed on top of the welding instrumentality to thereby heat the abutment surfaces which are to be joined. The "welding mirror" may be provided with an opening through which the spring 17 may project. Once the material of the abutment faces of the sections 2 and 3 is sufficiently heated, the welding instrumentality is removed and the two sections 2 and 3 are welded together along the line 4 in a usual manner. When this is done the valve consisting of only three components, namely the components 12, 13 and 17, is maintained in its predetermined position and is operative. It will be appreciated that other types of welding, for instance by ultrasonics, are also suitable for this purpose. To fill the chamber 1a with fuel a conventional fuel storage reservoir, such as an ampule, is placed against the free end of the valve body 13 and pressed inwardly. This deflects the valve body 13 and the sealing ring 12 away from the valve seat and permits fuel to issue from the ampule and to pass through the openings 14, 15 into the interior of the chamber 1a. The extent of movement of the valve body 13 is delimited either by the compressibility of the spring 17 or by abutment of the valve body 13 against the pin 19. Of course, it will be appreciated that the opening 15 initially will move out of the sealing ring 12 so that the communication between the ampule and the interior of the chamber 1a is established. During subsequent continued movement the valve sealing ring 12 also is deflected inwardly on being engaged by the transversely extending projecting portion 13a of the valve body 13, and this opens the venting channel 16. The valve is restored to sealing condition by the spring 17 when the inwardly directed force of the ampule is released.

Figure 2:
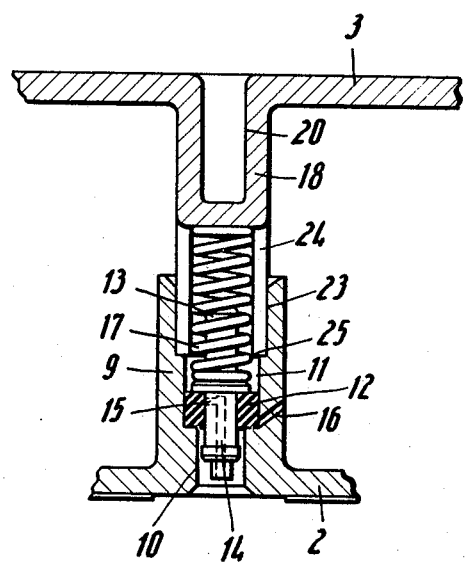
FIG. 2 is a fragmentary section through a portion of a fuel tank constructed in accordance with another embodiment of the invention.

The embodiment illustrated in FIG. 2 is quite similar to that of FIG. 1 and identical reference numerals have been used to identify identical components. In this embodiment, however, the sleeve-shaped portion is provided with still a third cylindrical channel 23 of a diameter still greater than that of the others. The projection 18, on the other hand, is provided with two legs 24 of arcuate configuration and which advantageously are of one piece with the projection 18, for instance by being formed therewith by injection molding. These legs 24 extend into the channel 23 and serve on the one hand to guide the spring 17 and on the other hand to abut with their end faces 25 against the sealing ring 12 once the latter has moved inwardly by a predetermined distance. With this construction of FIG. 2 the sealing ring 12 initially moves inwardly when the valve body 13 is displaced in inward direction, so that the vent opening 16 is opened immediately. The inlet opening 15 for the gaseous fluid, however, is opened only when the sealing ring 12 abuts against the end faces 25 of the legs 24 and the valve body 13 now moves further inwardly as well as with reference to the sealing ring 12.

It will be appreciated, of course, that it is not entirely necessary for the spring 17 to abut directly against the projection 18. It is clear that an indirect abutment is also possible just as it is clear that the projection 18 may also serve to locate and position the component parts of still a second valve adjacent the first one and for example disposed in a second sleeve-shaped portion 9.

By resorting to our novel construction the number of components required for the valve assembly, the number of assembling operations and the number of steps required in preparing the various components is so reduced that the expense of the entire valve assembly together with the tank itself is approximately the same as heretofore the expense for a valve assembly alone.

Finally, it should be mentioned that the burner valve may be similarly disposed in the interior of the tank, if this is desired.

It will be understood that each of the elements described above, or two or more together, may also find a useful application in other types of lighters differing from the types described above.

While the invention has been illustrated and described as embodied in a lighter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. In a lighter, particularly in a gas lighter, a combination comprising a fuel tank including two hollow tank sections adapted to be fluid-tightly connected with one another so as to define an internal fuel chamber, one of said tank sections being provided interiorly thereof with an abutment portion and the other of said tank sections being provided interiorly thereof with a substantially sleeve-shaped portion projecting towards said abutment portion when said sections are connected and having an open inner end facing said abutment portion, an outer end communicating with the exterior of said tank, and an additional abutment portion in said sleeve-shaped portion intermediate said inner and outer ends; and a valve assembly received in predetermined position in said sleeve-shaped portion confined between said abutment portions but accessible from the exterior of said fuel tank, and being maintained against displacement from said predetermined position by said abutment portion of said one tank section when said tank sections are connected with one another and together define said internal fuel chamber.

2. In a lighter as defined in claim 1, said additional abutment portion being an annular sealing member having a center aperture; and wherein said valve assembly comprises a valve both slidably extending through said center aperture slidable between a valve closing position and a valve opening position, said body having one portion normally located within the confines of said sealing member when said body is in said valve closing position and another portion located exteriorly of said center aperture intermediate said sealing member and said outer end, said valve body comprising a filling passage having an outer open end in said other portion and an inner open end in said one portion, said inner open end of said filling passage being fluid-tightly closed when said valve body is in said valve closing position but being exposed in response to movement of said body to valve opening position.

3. In a lighter as defined in claim 1, wherein said tank sections consist of synthetic plastic material.

4. In a lighter as defined in claim 1, wherein said sleeve-shaped portion constitutes a valve housing for said valve assembly.

5. In a lighter as defined in claim 1, said sleeve-shaped portion having a central passage extending from said inner end to said outer end, and a radially inwardly projecting annular valve seat in said passage intermediate said ends; and wherein said valve assembly comprises a valve body received in said passage inwardly of said valve seat and a biasing spring bearing against said one tank section and engaging said valve body for urging the latter in direction towards said outer end and thereby into sealing engagement with said valve seat.

6. In a lighter as defined in claim 5, said biasing spring bearing directly against said abutment portion of said one tank section.

7. In a lighter as defined in claim 5, said biasing spring bearing indirectly against said abutment portion of said one tank section.

8. In a lighter as defined in claim 5, wherein said abutment portion comprises a projection extending from said one tank section towards said inner end of said sleeve-shaped portion of said other tank section, said biasing spring bearing against said projection.

9. In a lighter as defined in claim 8, said projection comprising locating means for engaging and locating said biasing spring in predetermined relationship relative to said projection.

10. In a lighter as defined in claim 5, said additional abutment portion being a sealing ring carried by said valve body movable therewith and adapted to engage said valve seat in sealing relationship; and wherein said abutment portion comprises a projection extending from said one tank section towards said inner end of said sleeve-shaped portion, said biasing spring bearing against said projection and the latter being constructed and arranged so as to limit movement of at least said sealing ring in direction away from said valve seat.

11. In a lighter as defined in claim 10, wherein said projection also limits movement of said valve body in direction away from said valve seat.

12. In a lighter as defined in claim 7; and further comprising a blind bore provided in said one tank section extending from the exterior thereof into said projection and adapted to accommodate a connecting element for connecting auxiliary components of said lighter to said fuel tank.

13. In a lighter as defined in claim 5, said sleeve-shaped portion being provided with a venting aperture having an inner end communicating with said fuel chamber and an outer end communicating with said passage inwardly of said valve seat so as to be closed when said valve body sealingly engages the latter, but to be open when said valve body is moved away from said valve seat.

References Cited

UNITED STATES PATENTS 3,154,935  11/1964  Ayres _____ 431—344

FOREIGN PATENTS 393,809  11/1965  Switzerland.

EDWARD G. FAVORS, Primary Examiner

PO-1050
(5/69)

UNITED STATES PATENT OFFICE
CERTIFICATE OF CORRECTION

Patent No. 3,516,776      Dated June 23, 1970

Inventor(s) Horst Dieterle and Peter Rabe

It is certified that error appears in the above-identified patent and that said Letters Patent are hereby corrected as shown below:

In the heading of the patent, line 4, the number "1969" should read --1967--.

SIGNED AND
SEALED
NOV 24 1970

(SEAL)
Attest:

Edward M. Fletcher, Jr.
Attesting Officer

WILLIAM E. SCHUYLER, JR.
Commissioner of Patents